United States Patent

[11] 3,584,477

[72] Inventor Robert M. Hainsfurther
 Pittsburgh, Pa.
[21] Appl. No. 692,232
[22] Filed Dec. 20, 1967
[45] Patented June 15, 1971
[73] Assignee PPG Industries, Inc.

[54] FLOAT GLASS TANK CONSTRUCTION
 1 Claim, 4 Drawing Figs.
[52] U.S. Cl. ................................................ 65/182R,
 65/374
[51] Int. Cl. ................................................ C03b 18/02
[50] Field of Search ........................................ 65/182, 99
 A, 65 A, 24, 26, 169

[56] References Cited
 UNITED STATES PATENTS
2,269,445 1/1942 Easter .......................... 65/26

| 3,260,585 | 7/1966 | Javaux .......................... | 65/182 |
| 3,332,763 | 7/1967 | Basler et al. .................. | 65/99 A |
| 3,393,061 | 7/1968 | Greenler et al. ............... | 65/99 A |
| 2,262,826 | 11/1941 | Willetts ......................... | 65/26 |
| 2,323,265 | 6/1943 | Willetts ......................... | 65/26 |
| 3,492,108 | 1/1970 | Augustin et al. .............. | 65/182 |

Primary Examiner—S. Leon Bashore
Assistant Examiner—J. B. Hardaway
Attorney—Chisholm and Spencer ABSTRACT: In the construction of a float bath tank to contain the molten bath, the bottom blocks are drilled to provide openings each to receive a threaded stud, which in turn receives a washer and nut so as to retain the bottom blocks in position. The opening is filled at least partially with powdered graphite, the graphite in the opening terminating at the level of the top of the block at the bottom of the bath. A clay refractory ramming mix may also be used to fill in a portion of the opening below the powdered graphite.

PATENTED JUN15 1971 3,584,477

INVENTOR
ROBERT M. HAINSFURTHER
BY
Chisholm and Spencer
ATTORNEYS

FLOAT GLASS TANK CONSTRUCTION

BACKGROUND OF THE INVENTION

In the process of manufacturing float glass as practiced today, a mass of glass is supported on a liquid bath, generally molten tin, and the glass is permitted to spread thereon and form a ribbon. The glass can be permitted to spread to its equilibrium thickness, on the order of 0.271 inch for a soda-lime-silica glass of composition similar to that of conventional plate and sheet glass, or may be attenuated to a thickness less than its equilibrium thickness, or may be controlled to form a thickness greater than its equilibrium thickness.

In any case, regardless of the glass thickness being produced, the bath of molten tin is confined in an elongated tank constructed of a steel shell lined with clay refractory blocks. Because the refractory blocks will float on tin, the practice is to bolt each block to the steel shell. This is accomplished by welding heat-resisting threaded studs to the interior of the shell, drilling each of the refractory blocks, so as to provide at least one and generally two or more counterbored openings, each to receive a stud generally one-half inch in diameter and 4 to 9 inches in length, a washer and nut, and then using a clay refractory to close the opening. The clay refractory used to close the opening is a ramming mix and is intended to eliminate contact of the stud, washer and nut with molten tin of the bath and possible contamination of the tin. The refractory blocks are leveled on a bed of granular leveling material, as for example, sand or the like, or may be shimmed with steel shims to the proper level.

A typical bath, for example 150 feet in length and sufficiently wide to produce a 100-inch wide ribbon of glass may include approximately 450 refractory blocks of various sizes and shapes, usually varying up to 24 inches by 36 inches in length and width. The thickness of the blocks generally varies, as from 6 to 12 inches or more, depending upon their location in the tank. Generally the glass entrance end tin of a bath is deeper than the exit end depth, and there are refractory sidewalls, such that the bath tank configuration is a troughlike container.

Each of the separate refractory blocks is counterbored to receive at least two studs, and the larger size blocks are bored for four studs. As can be readily seen, there are perhaps 1400 or more studs welded to a typical steel shell and a like number openings in the bottom blocks, each opening requiring ramming mix to fill to the top level of the block, which top level is the bottom of the trough. Inasmuch as the ramming mix contains water, considerable time is required to heat cure the mix before tin is introduced into the tank. At times on preheat, cracking of some bottom blocks has been experienced. It has also been found that the ramming mix erodes and portions have risen to the surface of the tin bath and into the bottom of the ribbon, upsetting the operation and making reject glass.

SUMMARY OF THE INVENTION

In accordance with the invention, at least portions of the openings drilled in the clay refractory blocks to receive the studs, washers and nuts adjacent the bath bottom are filled with powdered carbon or graphite, which graphite extends to the level of the top of the block, which top forms the bottom of the float bath tank.

To accomplish this, there are several alternatives, as follows:

1. Powdered graphite is poured around the stud to the level of the lower shoulder of the opening, a washer and nut are placed on the stud, the nut tightened and
   a. ramming mix is applied over the washer and nut to a a level below the top of the block, and powdered graphite is poured thereover to the level of the top of the block, or
   b. powdered graphite is poured over the washer and nut to the level of the top of the block, or
2. No powdered graphite is poured around the stud prior to placing the washer and nut thereon, but either procedure, *a* or *b*, above is then followed.

In any event, the surface presented to the bath material, i.e., tin, is powdered graphite. After the openings have been filled, the tank is preheated either with tin therein or to a temperature on the order of 400° F. after which tin is introduced in bar form to melt therein. Preheating and/or heating is performed with a controlled atmosphere, as for example, a mixture of nitrogen and hydrogen, so as to prevent oxidization of the graphite and of the tin.

Even though the density of graphite is less than that of tin, graphite has a large interfacial tension with respect to tin, and if undisturbed, remains in the position in which it is placed. This occurs because the force on any particle of graphite resulting from the combination of interfacial tensions and buoyant forces is in a downward direction. For the buoyant force of the tin to become active, it must act from beneath the particles. The tin does not wet with the graphite, so will not adhere thereto.

THE PREFERRED EMBODIMENT

Figure 1:
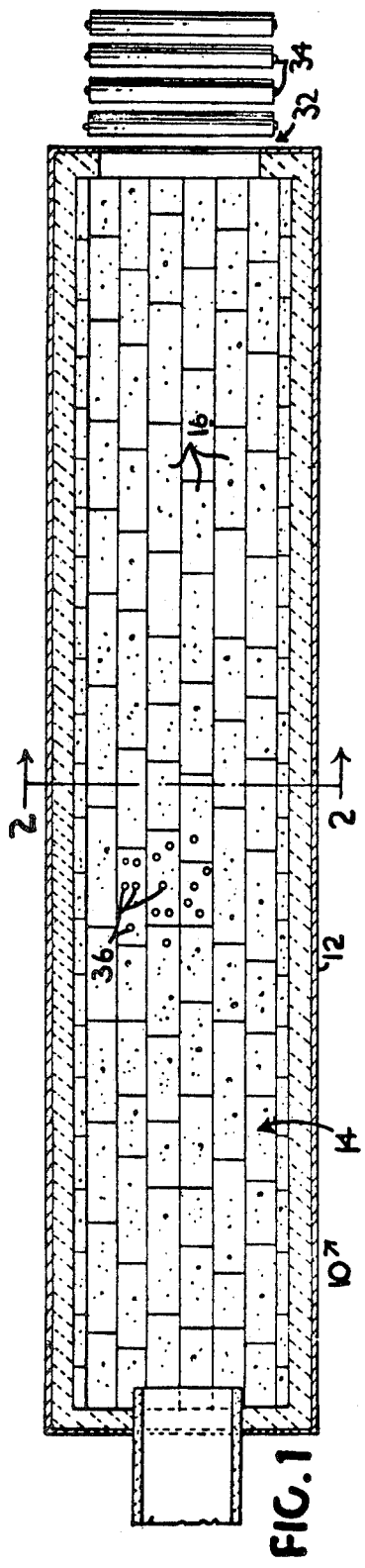
FIG. 1 is a plan view of a typical float bath tank showing the bottom as constructed of a plurality of refractory blocks.
Figure 4:
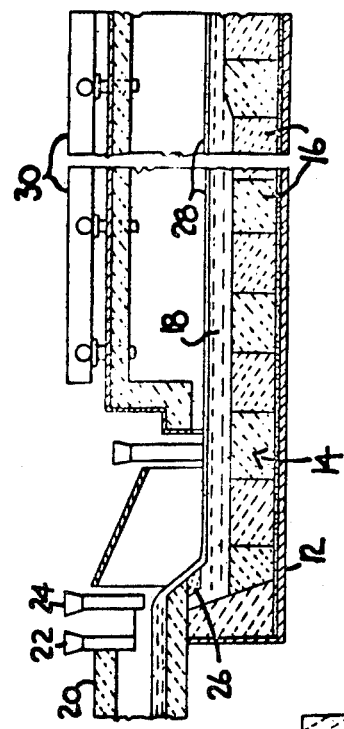
FIG. 4 is a partial longitudinal sectional view of a typical float glass producing apparatus for purposes of description.
Figure 2:
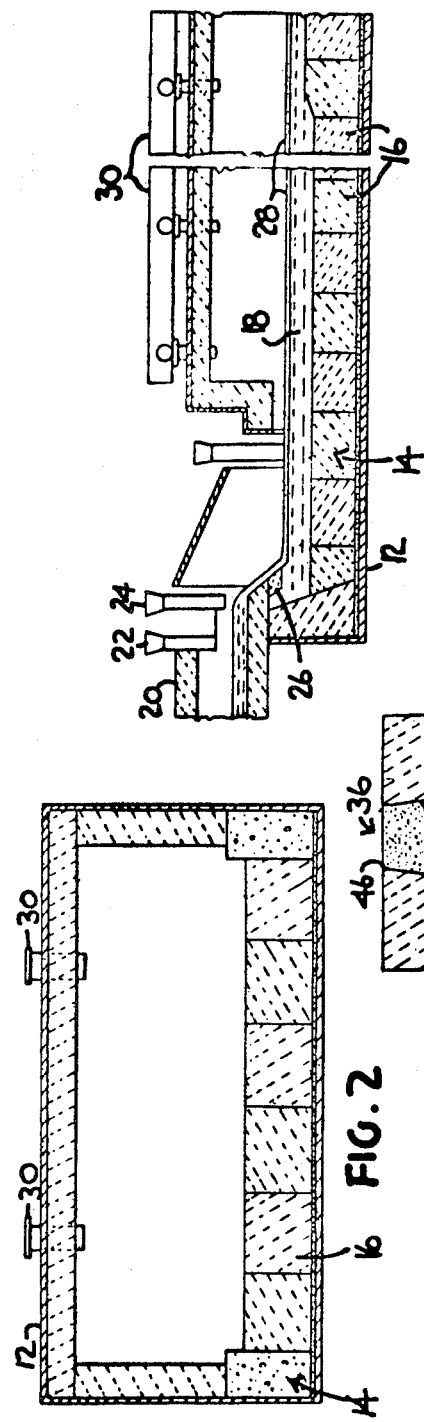
FIG. 2 is a sectional view taken on line 2-2 of FIG. 1.

Referring now to the drawings, there is shown a float bath tank, generally identified as 10, which includes a steel shell 12 and a refractory lining 14. The refractory lining has a ceiling, sidewalls and a bottom, as shown, the bottom being constructed of a plurality of clay refractory blocks 16. The blocks 16 are illustrated as being substantially the same shape, i.e., rectangular; however it is to be understood that they may be of different shapes, sizes and dimensions, all fitted into the shell with substantially uniform width joints therebetween to allow for normal expansion upon heating. The bottom is a troughlike contour to receive a body or bath of molten tin 18 (see FIG. 4) onto which a mass of glass is deposited from a melting tank 20 past a pair of refractory tweels 22, 24 which control flow, over a spout 26 onto the bath 18 to form a ribbon 28 of glass. Suitable atmosphere such as a mixture of nitrogen and hydrogen, as for example, 5 percent nitrogen, 5 percent hydrogen, is supplied through headers 30, so as to prevent oxidization of the bath and the formation of dross thereon which could adhere to the glass and make it unacceptable and of reject quality. The glass ribbon is cooled downstream on the bath, is removed from the bath at the exit end 32 of the bath tank and conveyed into an annealing lehr (not shown) on conveying rolls 34.

Figure 3:
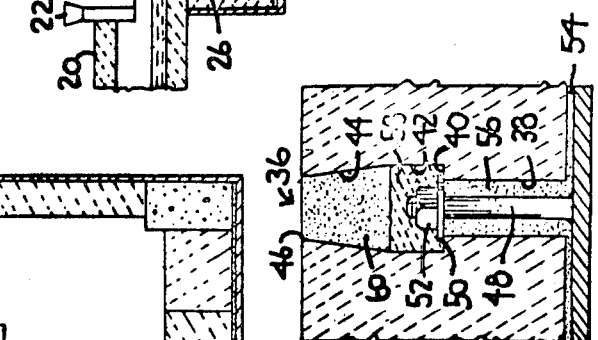
FIG. 3 is an enlarged sectional view illustrating a typical connection of a block to the steel shell and incorporating one embodiment of this invention.

Each of the blocks 16 is retained in position by being bolted to the steel shell 12. To accomplish this, each block is drilled to provide one or more openings 36 of a configuration illustrated in FIG. 3. From bottom to top each opening has a first cylindrical bore 38 terminating in a shoulder 40, a second cylindrical bore 42, a conical bore 44, tapering toward the top of the block and a final cylindrical bore 46. Threaded steel studs 48 are welded to the steel shell 12 and the blocks are placed thereover. A washer 50 is received on the shoulder 42 and a nut 52 is threaded onto the stud 48.

When placing the blocks in position, a leveling material 54, such as sand or perhaps a steel shim, is placed on the steel shell.

In accordance with one embodiment of the invention, a mass 56 of powdered graphite, is poured around the stud 48, so as to fill the bore 38 prior to assembling the washer 50 onto the stud.

After tightening the nut 52, a ramming mix 58 is inserted into the opening 36 over the washer 50, the nut 52 and onto the shoulder 40 to a level which fills or approximately fills the bore 42. Thereafter, a mass 60 of powdered graphite is poured into the opening to a level substantially level with the top of the block, which top will be the tin contact portion of the block.

It has been found that the powdered graphite remains in position and eliminates glass defects caused by clay ramming mix rising to the surface of the tin bath. Also the placement of the graphite and mix, as described, protects molten tin from contamination by contact with the steel studs.

In the invention above described, reference is made to a clay refractory ramming mix. A typical ramming mix has a composition by weight of

| | |
|---|---|
| $SiO_2$ | 37.19 percent |
| $Na_2O$ | 0.39 percent |
| $K_2O$ | 0.67 percent |
| CaO | 1.73 percent |
| MgO | 0.77 percent |
| $Al_2O_3$ | 18.06 percent |
| $Fe_2O_3$ | 0.75 percent |
| $SO_3$ | 0.11 percent |
| $ZrO_2$ | 32.58 percent |
| $TiO_2$ | 1.06 percent |
| $Cr_2O_3$ | 0.008 percent |
| $P_2O_5$ | 0.09 percent |

The ramming mix is purchased as a powder, and for use is mixed with approximately 5 pints of water per hundred pounds. It is handled and used like any mortar.

Typical bottom blocks are known as Diddier or Findlay blocks, having representative compositions by weight, as follows:

| | Diddier, percent | Findlay, percent |
|---|---|---|
| $SiO_2$ | 69.88 | 68.4 |
| $Na_2O$ | 0.53 | 0.2 |
| $K_2O$ | 1.97 | 1.1 |
| CaO | 0.06 | 0.1 |
| MgO | 0.35 | 0.2 |
| $Al_2O_3$ | 24.12 | 28.7 |
| $Fe_2O_3$ | 0.91 | 0.72 |
| $TiO_2$ | 1.73 | 0.6 |
| $Cr_2O_3$ | 0.021 | |

The powdered graphite used should be reasonably free of ash, i.e., less than 1 percent and should have a low calcium content, so as to eliminate a source of gas causing a bubble condition in the bottom of the ribbon.

A typical graphite powder is Grade No. 38 produced by the National Carbon Company. A typical analysis of this grade of powdered graphite is:

| | |
|---|---|
| Ash | maximum 0.2 percent |
| Minimum fineness | 98.5 percent through a 200 mesh screen |
| Moisture content | maximum 0.5 percent |
| Sulfur content | maximum 0.015 percent |

A spectroscopic analysis of this grade of powdered graphite is:

| | Percent |
|---|---|
| Al | 0.002 |
| Ca | 0.04 |
| Fe | 0.02 |
| Mg | 0.002 |
| Si | 0.04 |
| Ti | 0.01 |
| V | 0.005 |
| Total impurities | 0.119 |

A typical screen analysis is:

| | Mesh | | | | | | | |
|---|---|---|---|---|---|---|---|---|
| | 10 | 20 | 35 | 65 | 100 | 150 | 200 | PAN |
| Percent (remaining) | 0 | 0 | 0 | 0 | 0 | 0 | 1 | 99 |

The individual particle sizes are:

99.9 percent less than 74 microns    (200 mesh)

99 percent less than 44 microns    (325 mesh)

97 percent less than 40 microns 81 percent less than 30 microns 58 percent less than 20 microns 49 percent less than 15 microns 30 percent less than 10 microns    (1250 mesh)

10 percent less than 5 microns

I claim:
1. A float bath tank comprising a bath of molten tin on which glass is supported, said tank including
 a steel shell lined with clay refractory blocks to form a bath bottom,
 said blocks being bolted to said shell by studs welded to said shell and terminating in openings in said blocks,
 a clay refractory in a portion of said openings below the upper terminus thereof, and
 powdered graphite in said opening and substantially filling said opening above said clay refractory therein, extending to a position level with the tops of said blocks,
 the tops of said blocks being in contact with said molten tin.